June 2, 1964 C. J. BADEWITZ 3,135,479
METHOD OF REDUCING VELOCITY VECTOR ANGULAR ERROR
OF A SPACE VEHICLE WHEN THRUST IS APPLIED
Filed April 1, 1963 2 Sheets-Sheet 1

INVENTOR.
CHARLES J. BADEWITZ
BY
Knox & Knox

INVENTOR.
CHARLES J. BADEWITZ

United States Patent Office 3,135,479
Patented June 2, 1964

3,135,479
METHOD OF REDUCING VELOCITY VECTOR ANGULAR ERROR OF A SPACE VEHICLE WHEN THRUST IS APPLIED
Charles J. Badewitz, San Diego, Calif., assignor to The Ryan Aeronautical Co., San Diego, Calif.
Filed Apr. 1, 1963, Ser. No. 269,506
8 Claims. (Cl. 244—1)

This invention relates generally to space vehicle attitude control and specifically to a method for reducing the effect of lateral velocity caused by applying a reactive force normal to the vehicle roll axis.

*Background*

The flight attitude of space vehicles usually is maintained relative to a stabilized platform within the vehicle, the platform itself being oriented with respect to predetermined reference coordinates, such as latitude, longitude, and the vertical between earth and the vehicle. Deviations of vehicle flight attitude from stabilized platform attitude are sensed by the platform, and corrective reactive forces are applied to remove the deviations. Reactive forces also are applied to change vehicle speed, course, and altitude.

Usually, small jet reaction engines, either of the hot expanding gas or cold, compressed gas type, are used for generating these flight control forces. Jet engines mounted to apply a force normal to each axis are used for attitude control. For acceleration and deceleration, the engines are mounted to apply forces coaxial to the vehicle roll axis.

When accelerative and decelerative forces are applied, it is desired merely to change vehicle speed without changing vehicle flight attitude, and direction of travel. To accomplish this single function, precise coaxial alignment of vehicle roll axis and jet engine thrust axis is required. Precise alignment of the vehicle and jet engine longitudinal axes is an ordinary installation procedure. Physical alignment of the two axes, however, does not ensure that the aerodynamic roll axis of the vehicle and the thrust axis of the gas jet will be symmetrical and coaxial. In practice, the two axes are seldom precisely aligned. As a result, accelerative and decelerative forces also apply a lateral velocity component that changes vehicle attitude and displaces the vehicle laterally. Consequently, when a space vehicle is decelerated to land or rendezvous with another space vehicle, attitude change and lateral displacement cause the vehicle to miss the predicted landing or rendezvous point.

If the lateral velocity component introduced by the deceleration force is distributed sequentially in a circular pattern about the vehicle center of mass on the roll axis, attitude changes and displacement in one direction are canceled by equal attitude changes and displacement in the opposite direction. Two equal, opposing vector forces cancel each other. As a result, the total effect of the lateral velocity component is zero. In practice, the desired circular distribution may be obtained by rotating the vehicle an integral number of complete revolutions, for optimum result, about the vehicle roll axis during the time the decelerative and attendant lateral forces are applied.

If a vehicle were given a fixed angular velocity (angular momentum) about its approximate thrust axis during a period of applying constant decelerative thrust, cancellation of the lateral velocity resulting from the lateral thrust component would be complete in each full revolution. Unfortunately, when jet reaction engines are used, the engines consume fuel and fuel expenditures reduce the vehicle mass. Consequently, the unwanted lateral acceleration (or velocity) increases for a decreasing mass subjected to a constant force (thrust). The aforementioned lateral velocity cancellation would therefore not be complete. However, a compensatory change in angular velocity occurs as a result of conservation of angular momentum. Specifically, the reduction in mass (and polar moment of inertia about the thrust axis) causes an increase in angular velocity. The net effect is that the lateral impulse per unit angle is nearly constant resulting in almost complete cancellation of lateral velocity in each revolution.

Accordingly, this invention is a simple method of rotating a space vehicle by jet means before firing decelerating retrojets and stopping rotation by jet means after deceleration, canceling thereby the effect of a lateral velocity component.

*Object*

It is a principal object of this invention to compensate for misalignment between the aerodynamic roll axis and retrojet thrust axis of a space vehicle.

It is another object of this invention to cancel the effect of a lateral velocity component introduced when decelerating a space vehicle by retrojet thrust.

It is still another object of this invention to rotate a vehicle prior to applying a decelerating force and to stop the rotation thereafter, whereby the effect of a lateral velocity component is reduced to approximately zero.

With these and other objects definitely in view, this invention consists in the novel combination and arrangement of elements as will be hereinafter fully described in the specification, particularly pointed out in the claims, and illustrated in the drawings that form a material part of this disclosure, and in which:

Figure 1:
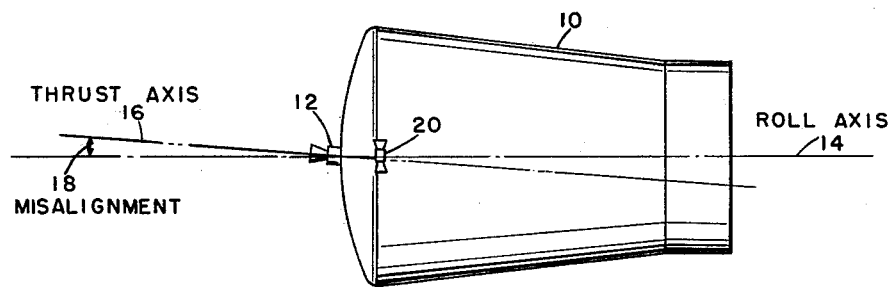
FIGURE 1 illustrates misalignment between the vehicle thrust and roll axes.

As previously stated, while the longitudinal axis of a retrojet engine and the longitudinal or roll axis of a vehicle may be precisely aligned physically, this physical alignment does not ensure that the thrust axis of the retrojet engine and the roll axis of the vehicle will be coaxial when the engine is operating. Misalignment between the thrust and roll axes is illustrated in FIGURE 1. Here vehicle 10 has retrojet engine 12 mounted to deliver a decelerating force along roll axis 14. When a jet reactive force is developed by engine 12, however, the engine thrust axis 16 and roll axis 14 are not parallel, but are misaligned by angle 18. As a result, the decelerating force vector has two components, one along the roll axis decelerating the vehicle, the other lateral thereto tending to change the vehicle attitude and position. To prevent a change in vehicle course, altitude, or position laterally during deceleration, the effect of this lateral velocity component must be eliminated.

Figure 2:
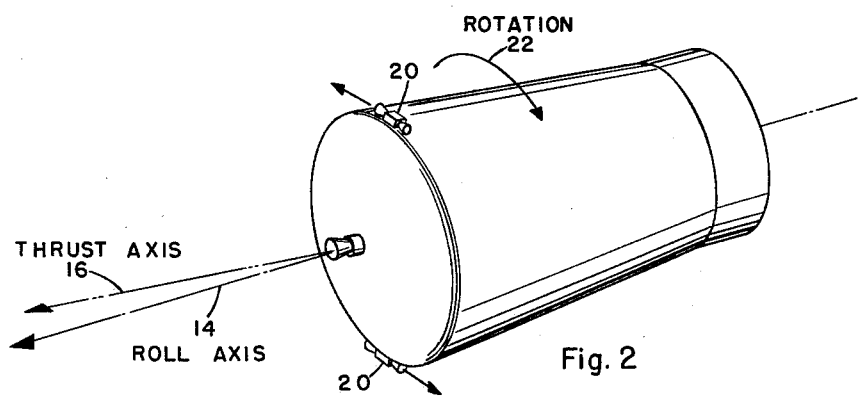
FIGURE 2 shows the relative locations of jet engines used for decelerating and rotating a vehicle.

In FIGURE 2, jet engines 20 are shown mounted in position to provide angular velocity and rotate vehicle 10 about roll axis 14 as indicated by arrow 22. Engines 20 may be operated by compressed gas controlled by a valve or hot gas controlled by valves and ignition means. Engines 20 may contain dual thrust chambers arranged to deliver thrust at different times in opposite directions or they may be arranged in sets to start rotation when one set is fired and stop rotation when another set is fired.

In the instant invention, a first set of engines 20 is fired for a short period to impart a constant angular velocity to the vehicle prior to firing retrojet engine 12. Then engine 12 is fired to start deceleration. After the desired deceleration is accomplished, engine 12 is shut off. The initial angular velocity was chosen to allow completion of an integral number of rotations during the retrojet firing. A second set of jet engines 20 is then fired to reduce the angular velocity to zero.

Figure 3:
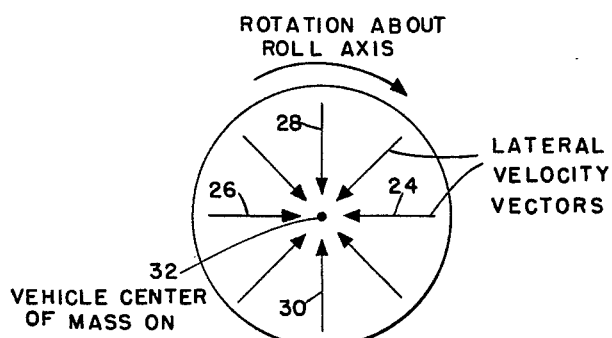
FIGURE 3 illustrates a rotating lateral velocity vector during vehicle rotation.

For the ideal case of constant thrust, mass, and deceleration and rotation rates, the effect of lateral velocity caused by misalignment of the retrojet thrust axis and vehicle roll axis is completely canceled, as illustrated in FIGURE 3. Pairs of lateral velocity vectors separated by 180 degrees, vectors 24 and 26 or 28 and 30 for example, displace the vehicle center of mass 32 by the same magnitude in opposite directions, with resultant zero displacement.

In practice, the vehicle mass is reduced as fuel is expended during engine operation. Consequently, although constant deceleration and rotation thrusts are applied, the deceleration and rotation rates and the lateral velocity components increase with decreasing mass. In this case, pairs of opposing lateral velocity vectors are not equal in magnitude, and complete cancellation is not accomplished. With the increasing rotation rate, however, each successive, increasing vector acts on the vehicle center of mass for a shorter length of time; and provides a compensating effect for opposing vector pairs of unequal magnitude, as illustrated in FIGURE 4.

Figure 4:
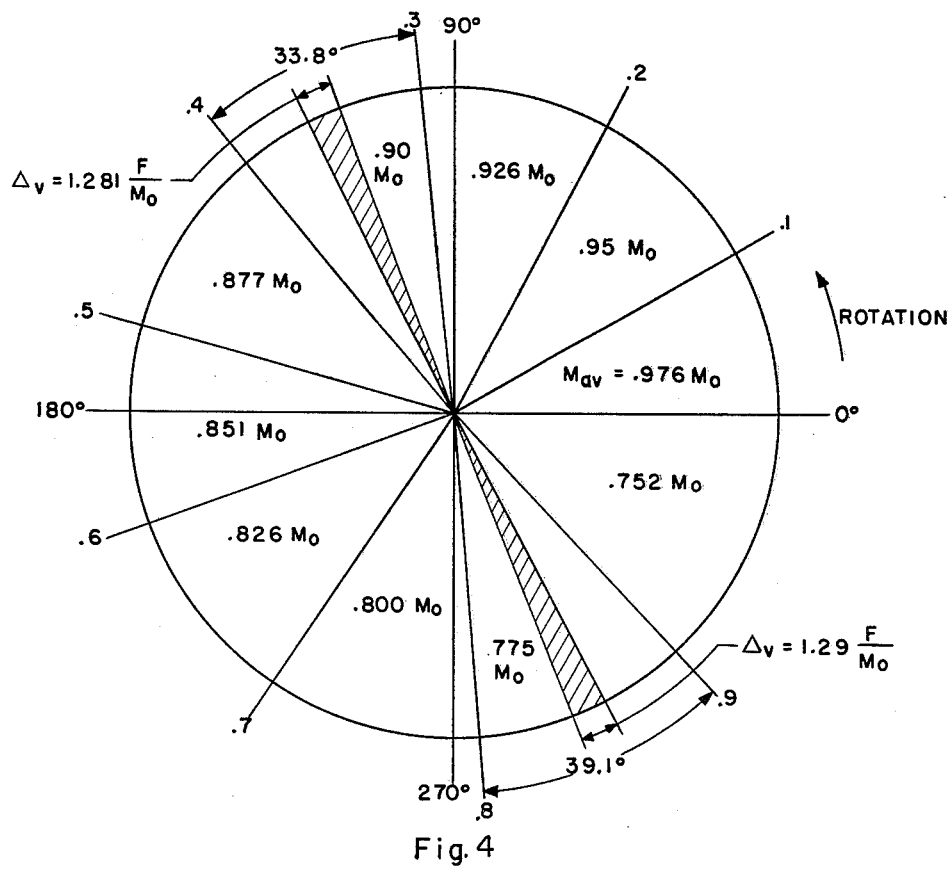
FIGURE 4 is a graph showing the changing mass and rotation rate for one vehicle rotation.

The graph and figures presented in FIGURE 4 are based on a vehicle with cylindrical body of 2000 pounds, eight feet long, and 10 feet in diameter. The graph shows a one-minute rotation period divided into 0.1 minute intervals, the number of degrees of rotation increasing and the mass decreasing progressively with each interval. Between 0.3 and 0.4, for example, the vehicle rotates 33.8 degrees, while between 0.8 and 0.9, the vehicle rotates 39.1 degrees. A small change in lateral velocity between 0.3 and 0.4 at point 34 is equal to 1.281 $F/M_0$. A small change in lateral velocity between 0.8 and 0.9 at point 36 is equal to 1.29 $F/M_0$. Points 34 and 36 are opposing. As a result, the vehicle center of mass is displaced by the difference in magnitude between the two vectors or only 0.009 $F/M_0$, a negligible magnitude.

The method of this invention may be used in both manned and unmanned vehicles. The retrojet and vehicle rotation engines may be controlled by a pilot using manual controls, a programmer containing a preset flight programmer, or by radio signals from a remote control station.

Figure 5:
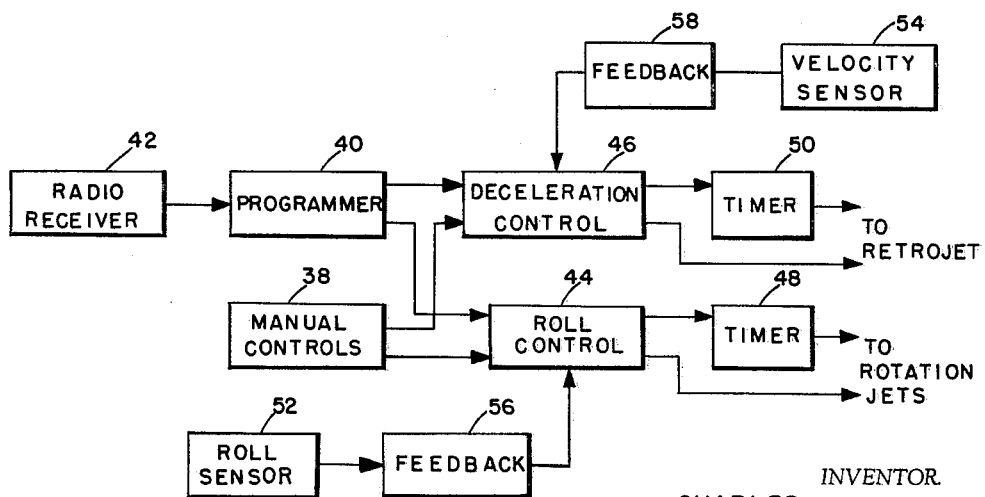
FIGURE 5 illustrates means for applying the method of the invention.

FIGURE 5 illustrates generally the means for applying the method. None of the functional components shown in FIGURE 5 is considered part of the invention. For each functional block represented, a number of suitable devices and circuits are known in the art. The specific device, circuit, and complete control system would be a matter of design and choice according to the particular vehicle and vehicle employment.

In FIGURE 5, three possible ways of initiating deceleration and rotation control signals are shown. Block 38 represents ordinary pilot controls such as pushbuttons or other switches for closing electrical circuits. Block 40 represents a typical programmer capable of having preset therein a timed flight program and generating control signals at appropriate times. The outputs of blocks 38 and 40 in this case are the same. Assuming the controls of block 38 close electrical circuits, programmer 40 closes the same circuits at the predicted and preset times. Block 42 is a radio receiver that may receive signals from a remote control station and change the program previously preset in programmer 40. Control signals from manual controls 38 or programmer 40 are fed to roll control 44 and deceleration control 46. Blocks 44 and 46 may contain relays, servomechanisms, or other circuits suitable for controlling timers 48 and 50 and the retrojet and rotation jet engines. Timers 48 and 50, sensors 52 and 54, and feedback networks 56 and 58 contain devices and circuits known to the art for use as hereinafter described.

In applying the method as described and claimed herein, first a control signal to roll control 44 is initiated at manual controls 38 or programmer 40, followed immediately thereafter by a control signal to deceleration control 46. Roll control 44 starts timer 48 and a first set of vehicle roll axis rotation engines. Immediately thereafter deceleration control 46 starts the timer 50 and the vehicle retrojet engine. If the engines operate with cold, compressed gas, controls 44 and 46 merely open valves in the supply line to the engines. If the engines operate with hot gas, controls 44 and 46 open valves in the propellant supply lines and turn on the ignition in the engine combustion and thrust chambers.

As the vehicle starts to rotate, roll sensor 52 sends a rotation feedback signal through feedback network 56 to roll control 44. At the same time, timer 48 times roll duration. The vehicle then rotates one complete revolution under constant thrust delivered by the rotation engines. When one revolution is completed, the feedback signal from roll sensor 52 causes roll control 44 to shut off the first set of rotation engines and start a second set to stop rotation. When rotation is stopped, lack of a feedback signal from roll sensor 52 causes roll control 44 to shut off the second set of rotation engines. Simultaneous with the engine start and shutoff signals caused by the aforesaid rotation feedback signals, timer 48 generates similar engine control signals based on elapsed time and the predicted time to complete one revolution, thus providing two means for starting and stopping the rotation engines. Roll control 44 and timer 48 also may be adjusted or designed to control the engines and stop rotation after two or more complete revolutions.

As the vehicle starts to decelerate, velocity sensor 54 sends a velocity feedback signal to deceleration control 46 through feedback network 58. At the same time, timer 50, synchronized with timer 48, times the deceleration period. The vehicle then decelerates under constant thrust delivered by the retrojet engine. When velocity sensor 54 senses the desired decreased velocity, a signal through feedback network 58 causes deceleration control 46 to shut off the retrojet engine. At the same time, timer 50 generates a similar signal. Since timers 48 and 50 are synchronized, shut off of the rotation and retrojet engines and completion of deceleration and the desired integral number of rotations are virtually simultaneous. After a preset time, timers 48 and 50 are returned to the zero position and turned off, and the system is ready for another deceleration cycle if necessary.

It is understood that minor variation from the form of the invention disclosed herein may be made without departure from the spirit and scope of the invention, and that the specification and drawing are to be considered as merely illustrative rather than limiting.

I claim:

1. A method of compensating for misalignment of the thrust axis and roll axis of a vehicle in flight, during deceleration, said method comprising:
   rotating said vehicle about said roll axis; and
   decelerating said vehicle along said thrust axis while said vehicle is rotating, said deceleration being timed to coincide with the time of an integral number of complete rotations of the vehicle about said roll axis.

2. The method of claim 1 in which one rotation only is completed during the period of deceleration.

3. A method of compensating for misalignment of the thrust axis and roll axis of a vehicle in flight, during deceleration, said method comprising:
   rotating said vehicle about said roll axis with constant thrust and at a rate increasing with decreasing mass;

decelerating said vehicle along said thrust axis with constant thrust and at a rate increasing with decreasing mass while said vehicle is rotating, said deceleration being timed to coincide with the time of an integral number of complete rotations of the vehicle about said roll axis, whereby said rotating cancels the effect of lateral velocity resulting from the decelerative force and misalignment of said thrust and roll axes.

4. The method of claim 3 in which one rotation only is completed during the period of deceleration.

5. A method of compensating for misalignment of the thrust axis and roll axis of a vehicle in flight, during deceleration, said method comprising:

starting first jet reaction engine means and imparting angular velocity with constant thrust to rotate said vehicle about said roll axis;

starting second jet reaction engine means and decelerating said vehicle with constant thrust along said thrust axis while said vehicle is rotating, said deceleration being timed to coincide with the time of an integral number of complete rotations of the vehicle about said roll axis;

stopping said second jet reaction engine means when desired deceleration is accomplished;

stopping said first jet reaction engine means after deceleration is stopped and an integral number of rotations are completed during the period of deceleration;

starting third jet reaction engine means and imparting angular force to said vehicle about said roll axis to stop rotation after stopping said first jet reaction engine means; and stopping said third jet reaction means when rotation is stopped, whereby rotation cancels the effect of lateral velocity resulting from the decelerative force and misalignment of said thrust and roll axes.

6. The method of claim 5 in which one rotation only is completed during the period of deceleration.

7. The method of claim 5 in which said jet reaction engines operate with hot, expanding gas.

8. The method of claim 5 in which said jet reaction engines operate with cold, compressed gas.

References Cited in the file of this patent

UNITED STATES PATENTS

| | | |
|---|---|---|
| 2,519,878 | Bjork | Aug. 22, 1950 |
| 3,001,739 | Faget | Sept. 26, 1961 |
| 3,088,406 | Horner | May 7, 1963 |